United States Patent Office 3,053,739
Patented Sept. 11, 1962

3,053,739
PROCESS OF PREPARING ANTI-H LECTIN
Margery P. Gray, Madison, Wis., assignor to Wisconsin Alumni Research Foundation, Madison, Wis., a corporation of Wisconsin
No Drawing. Filed Mar. 11, 1960, Ser. No. 14,166
4 Claims. (Cl. 195—4)

The present invention relates to the blood typing field and more specifically to the improved process of preparing high titer plant agglutinins, known in the art as lectins, from certain plant extracts. The lectins herein involved can be used in the differentiation of type $A_1$ blood from type $A_2$ blood and secretor from non-secretor for ABO(H) substances. The separation of the A group blood into subgroups $A_1$ and $A_2$ can be important in avoiding transfusion reactions as well as in ascertaining paternity where this problem is involved.

The use of certain lectins (plant agglutinins) in the blood typing field is well known. Saline extracts of the seeds of *Ulex europeus*, a legume, containing anti-H lectin, for example, have been used successfully in the differentiation of type $A_1$ from type $A_2$ blood. Boyd, W. C., et al., Jour. Lab. & Clin. Med. 44:235–237 (1954). These extracts have also been used in the separation of individuals of any blood group into secretors and non-secretors.. Boyd, W. C., et al., Blood 9:1195–1198 (1954). Extracts of the seeds of *Dolichos bifloris* containing anti-$A_1$ lectin have also been used in blood typing to differentiate subgroup $A_2$ blood from subgroup $A_1$ blood. The use of both, i.e. the anti-H lectin to differentiate type $A_1$ from type $A_2$ blood and the anti-$A_1$ lectin to differentiate type $A_2$ from type $A_1$ blood, provides a double check and can be employed as such to advantage in blood typing operations.

The available anti-H and anti-$A_1$ lectins used heretofore in the blood typing field were obtained, respectively, from extracts of the specified Ulex and Dolichos seeds noted above. The old process essentially consisted in the extraction of the seeds with saline solution, protein fractionation of the resulting saline extract with an alcohol such as ethanol, followed by dialysis for further purification. This involved process proved to be tedious and time-consuming and at best produced expensive, relatively unstable products of low titer.

In the search for improved processes and improved products for use in this field, I discovered that potent anti-H lectin products can be prepared readily by subjecting seeds of *Ulex europeus* in an aqueous medium to the action of the proteolytic enzyme, bromelin, obtained from pineapple. The anti-H lectin produced by the enzyme is in solution in the water and can be recovered by separation of the liquid material from the solid material such as by decanting the supernatant from the seed pulp. If the supernatant is not clear it can be further purified by centrifuging to remove any insoluble material. I also discovered that potent anti-$A_1$ lectin can be prepared in a similar manner by subjecting seeds of *Dolichos bifloris* in an aqueous medium to the action of bromelin. The processes employing bromelin are simple compared to the old processes and of utmost importance have been found to produce relatively stable improved lectin products of high titer.

The following examples will serve to illustrate the invention.

Example I

About 5 grams of *Ulex europeus* seeds are first ground in a mortar mill and a solution of 100 mg. of bromelin and 250 mg. of ethylene-diamine-tetra-acetic acid di-sodium salt (EDTA) plus 250 mg. of ascorbic acid dissolved in about 50 ml. of normal saline is next added to the ground material. The resulting mixture is then agitated at room temperature for about one hour. The lectin is recovered in clear solution form by decanting the supernatant from the seed pulp followed by centrifuging to remove any insoluble material retained in the supernatant. The resulting 40 ml. of clear solution has a titer (measure of activity) of about 1:64 with type $A_2$ red blood cells. Titers of untreated extracts, i.e. obtained from the same Ulex seeds without bromelin, rarely exceed 1:8 against $A_2$ red blood cells.

Example II

This example follows the procedure set forth in Example I, except that seeds of *Dolichos bifloris* are used in place of the seeds of *Ulex europeus*.

The addition of ethylene-diamine-tetra-acetic acid di-sodium salt (EDTA) and ascorbic acid as in the above example is not essential although the use of a small amount of EDTA di-sodium salt or like sequestering agent is preferred as it ties up calcium and prevents any gradual darkening of the extract due to the breakdown of bromelin. The use of an anti-oxidant such as ascorbic acid also has been found to improve stability very markedly, e.g. with ascorbic acid, preparations can be left at room temperatures for hours rather than minutes without substantial loss of activity. Varying amounts of sequestering agent and anti-oxidant can be used with the optimum amounts being readily ascertained by preliminary test.

The seeds are preferably broken up or crushed to expose a large amount of surface or material to the action of the enzyme which, in some manner, not completely understood at this time, enzymatically modifies certain ingredients present in the seeds, by breaking them down or building them up or both, into the desired active lectins. The amount of water used is not critical except that sufficient water should be present to dissolve all of the active lectin material, as this makes it easy to separate the water-soluble or active material from the water-insoluble or inactive material. The use of about 100 grams of crushed seeds with about a liter or more of an aqueous medium such as normal saline is illustrative. The amount of the enzyme used is also not critical although sufficient enzyme should be present to convert substantially all of the material capable of being converted into the active lectins in one-half hour up to a few hours, i.e. within a reasonable time. The temperature employed can advantageously be room temperature although temperatures below or above room temperature can be used as long as they do not inactivate or deleteriously effect the activity of the enzyme. Here again, optimum conditions for any particular operation can be ascertained by preliminary tests.

The bromelin, sequestering agent (EDTA) and anti-oxidant (ascorbic acid) mixture described above can be dissolved or suspended in distilled water, saline and the like and used as described in Example I. The mixture can also be used generally in the immunohematology field, e.g. in crossmatching and in antibody studies, where the enzyme bromelin is used today. Investigations in this connection have demonstrated that the ethylene-diamine-tetra-acetic acid di-sodium salt-ascorbic acid combination does not deleteriously interfere with the blood tests and that the presence of the combination provides a bromelin preparation of markedly improved stability of the type desired.

I claim:

1. In the process of preparing anti-H lectin from seeds of *Ulex europeus*, the improvement which consists in subjecting the seeds in an aqueous medium to action of the proteolytic enzyme, bromelin.

2. In the process of preparing anti-$A_1$ lectin from the seeds of *Dolichos bifloris*, the improvement which consists in subjecting the seeds in an aqueous medium to action of the proteolytic enzyme, bromelin.

3. The improved process of preparing a high titered anti-H lectin which comprises grinding *Ulex europeus* seeds, adding bromelin, ethylene-diamine-tetra-acetic acid di-sodium salt and ascorbic acid dissolved in normal saline to the ground seeds, agitating the resulting aqueous mixture, and recovering the solution containing the anti-H factor by separating the liquid from the insoluble material in the agitated mixture.

4. The improved process of preparing a high titered anti-$A_1$ lectin which comprises grinding *Dolichos bifloris* seeds, adding bromelin, ethylene-diamine-tetra-acetic acid di-sodium salt and ascorbic acid dissolved in normal saline to the ground seeds, agitating the resulting aqueous mixture, and recovering the solution containing the anti-$A_1$ factor by separating the liquid from the insoluble material in the agitated mixture.

References Cited in the file of this patent

UNITED STATES PATENTS

| 2,051,017 | Schwarz | Aug. 11, 1930 |
| 2,806,815 | Singher et al. | Sept. 17, 1957 |
| 2,824,044 | Miescher et al. | Feb. 18, 1958 |
| 2,958,632 | Schwarz et al. | Nov. 1, 1960 |

OTHER REFERENCES

Tauber: "Enzyme Technology," John Wiley and Sons, Inc., New York (1943), pp. 132–135.